(12) United States Patent
Babinski et al.

(10) Patent No.: US 8,508,881 B1
(45) Date of Patent: Aug. 13, 2013

(54) DISK DRIVE EMPLOYING SYSTEM INVERSION FOR TUNING SEEK TO SETTLE SERVO LOOP

(75) Inventors: Alexander Babinski, Laguna Niguel, CA (US); Orhan Beker, Aliso Viejo, CA (US); Duc T. Phan, Saratoga, CA (US); Donald Brunnett, Pleasanton, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 267 days.

(21) Appl. No.: 13/117,036

(22) Filed: May 26, 2011

(51) Int. Cl.
*G11B 5/596* (2006.01)

(52) U.S. Cl.
USPC .................................. 360/78.04; 360/78.06

(58) Field of Classification Search
None
See application file for complete search history.

(56) References Cited

U.S. PATENT DOCUMENTS

| | | | |
|---|---|---|---|
| 5,793,558 A | 8/1998 | Codilian et al. | |
| 6,013,995 A | 1/2000 | Kim | |
| 6,031,684 A | 2/2000 | Gregg | |
| 6,490,120 B1 | 12/2002 | Burton et al. | |
| 6,501,613 B1 | 12/2002 | Shih | |
| 6,504,670 B1 * | 1/2003 | Dittmar | 360/78.07 |
| 6,563,663 B1 | 5/2003 | Bi et al. | |
| 6,614,615 B1 | 9/2003 | Ju et al. | |
| 6,636,377 B1 | 10/2003 | Yu et al. | |
| 6,686,716 B1 | 2/2004 | Predina et al. | |
| 6,738,220 B1 | 5/2004 | Codilian | |
| 6,781,787 B1 | 8/2004 | Codilian et al. | |
| 6,967,811 B1 | 11/2005 | Codilian et al. | |
| 6,999,267 B1 | 2/2006 | Melkote et al. | |
| 7,170,581 B2 | 1/2007 | Tousain | |
| 7,206,162 B2 | 4/2007 | Semba et al. | |
| 7,298,574 B1 | 11/2007 | Melkote et al. | |
| 7,394,614 B2 * | 7/2008 | Kang | 360/78.09 |
| 7,626,782 B1 | 12/2009 | Yu et al. | |
| 7,839,600 B1 | 11/2010 | Babinski et al. | |
| 7,876,523 B1 | 1/2011 | Panyavoravaj et al. | |
| 2002/0006010 A1 | 1/2002 | Ding et al. | |

OTHER PUBLICATIONS

Yang Quan Chen, Kevin L. Moore, Jie Yu, Tao Zhang, "Iterative Learning Control and Repetitive Control in Hard Disk Drive Industry—A Tutorial", Proceedings 2006 IEEE Conference on Decision and Control, San Diego, CA, Dec. 2006.

Mingxuan Sun, Danwei Wang, "Closed-loop iterative learning control for non-linear systems with initial shifts", International Journal of Adaptive Control Signal Process, 16 (7), 2002, 515-538.

Douglas A. Bristow, Marina Tharayil, Andrew G. Alleyne, "A Survey of Iterative Learning Control a learning-based method for high-performance tracking control", IEEE Control Systems Magazine, 2006, vol. 26: pp. 96-114.

F. L. Lewis, M. A. Christodoulou, B. G. Mertzois, "System Inversion using Orthogonal Functions*", Circuits Systems Signal Process, vol. 6, No. 3, 1987.

* cited by examiner

*Primary Examiner* — Paul Huber

(57) ABSTRACT

A method is disclosed of operating a disk drive, the disk drive comprising a disk having a plurality of tracks, a head, and a closed loop servo system comprising a seek servo loop and a settle servo loop for actuating the head over the disk. The seek servo loop is used to seek the head toward a target track. When the head approaches the target track, the settle servo loop is used to settle the head on the target track in response to a reference signal generated in response to a system inversion of the settle servo loop.

18 Claims, 6 Drawing Sheets

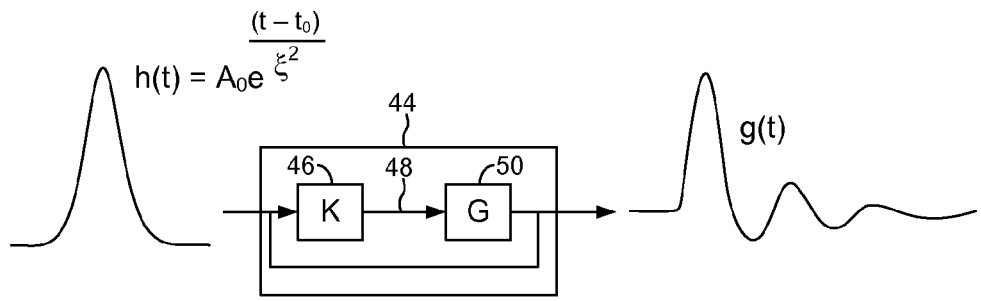

FIG. 3A $$\sum_{j=1}^{M} w_j h(t - \xi_j) \overset{LTI}{\Longleftrightarrow} \sum_{j=1}^{M} w_j g(t - \xi_j)$$

FIG. 3B $$Y_{ref}(k) = \sum_{j=0}^{M-1} w_j h_j(k) \qquad w_j = \frac{1}{N+1} \sum_{i=0}^{N} Y_{des}(i) q_j(i)$$

FIG. 3C $$q(k) = \frac{1}{M} \sum_{i=0}^{N} \left( \sum \frac{v_{-n}^m}{\lambda_m} \right) g_n(k)$$

$$h_j(k) = h(<(N+1) - j\frac{(N+1)}{M} + k>_{(N+1)}) \qquad g_n(k) = g(<(N+1) - n\frac{(N+1)}{M} + k>_{(N+1)})$$

$$q_j(k) = q(<(N+1) - j\frac{(N+1)}{M} + k>_{(N+1)}) \qquad v_{-n} = e^{-i\frac{2\pi n}{M}}$$

$$\lambda_m = M \sum_j |a_{m-j}|^2 \quad j = 0, \pm M, \pm 2M \ldots, \qquad a_n = \frac{1}{N+1} \sum_{k=0}^{N} g(k) v_k^{-n}$$

$$<k>_M \equiv k \bmod M = r; \quad k = lM + r, \quad 0 \leq r \leq M - 1$$

FIG. 3D

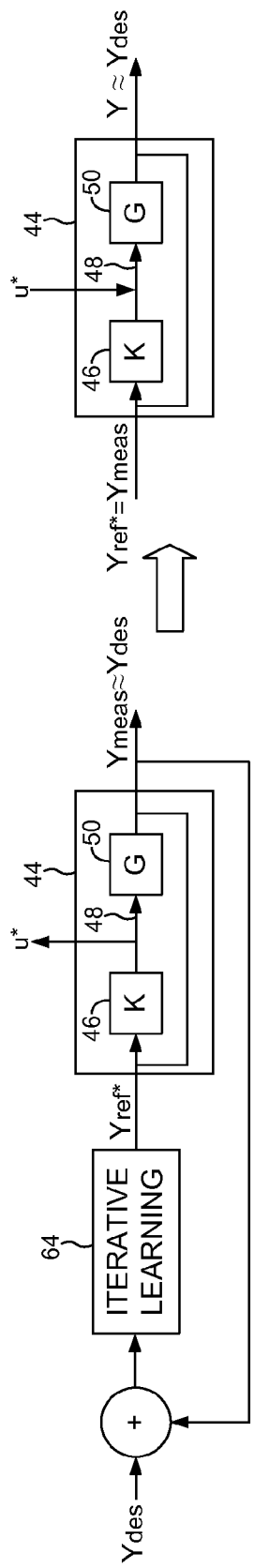
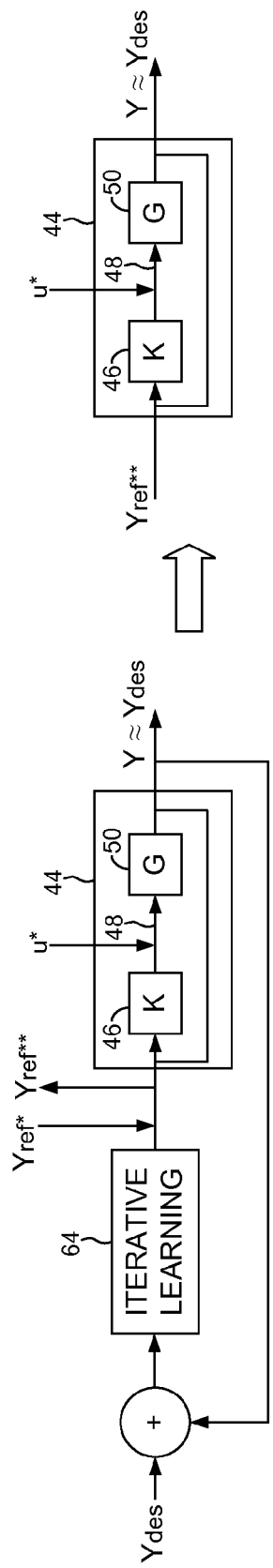
FIG. 5A
FIG. 5B

DISK DRIVE EMPLOYING SYSTEM INVERSION FOR TUNING SEEK TO SETTLE SERVO LOOP

BACKGROUND

Disk drives comprise a disk and a head connected to a distal end of an actuator arm which is rotated about a pivot by a voice coil motor (VCM) to position the head radially over the disk. The disk comprises a plurality of radially spaced, concentric tracks for recording user data sectors and servo sectors. The servo sectors comprise head positioning information (e.g., a track address) which is read by the head and processed by a servo control system to control the actuator arm as it seeks from track to track.

FIG. 1 shows a prior art disk format 2 as comprising a number of data tracks 6 defined by servo sectors $4_0$-$4_N$ recorded around the circumference of each data track. Each servo sector 4, comprises a preamble 8 for storing a periodic pattern, which allows proper gain adjustment and timing synchronization of the read signal, and a sync mark 10 for storing a special pattern used to symbol synchronize to a servo data field 12. The servo data field 12 stores coarse head positioning information, such as a track address, used to position the head over a target data track during a seek operation. Each servo sector 4, further comprises groups of servo bursts 14 (e.g., A, B, C and D bursts), which comprise a number of consecutive transitions recorded at precise intervals and offsets with respect to a data track centerline. The groups of servo bursts 14 provide fine head position information used for centerline tracking while accessing a data track during write/read operations.

BRIEF DESCRIPTION OF THE DRAWINGS

FIG. 3A shows an embodiment of the present invention wherein a function h is applied to the settle servo loop of the closed loop servo system and an output g is measured.

FIG. 3B illustrates how a linear combination of the function h will result in a corresponding linear combination of the output g.

FIG. 3C shows an embodiment of the present invention wherein the reference signal can be represented as a linear combination of time-shifted, weighted versions of h, wherein the weights (coefficients) can be generated in response to the measured output g.

FIG. 3D shows an embodiment of the present invention wherein the coefficients are generated in response to a dual basis function generated using a discrete Fourier transform of the measured output g.

FIG. 5A shows an embodiment of the present invention wherein the servo control signal is saved while adapting the coefficients and then used as a feed-forward control signal during normal operation.

FIG. 5B shows an embodiment of the present invention wherein while applying the feed-forward control signal, the reference signal is adapted using iterative learning control.

DETAILED DESCRIPTION OF EMBODIMENTS OF THE INVENTION

Figure 1:
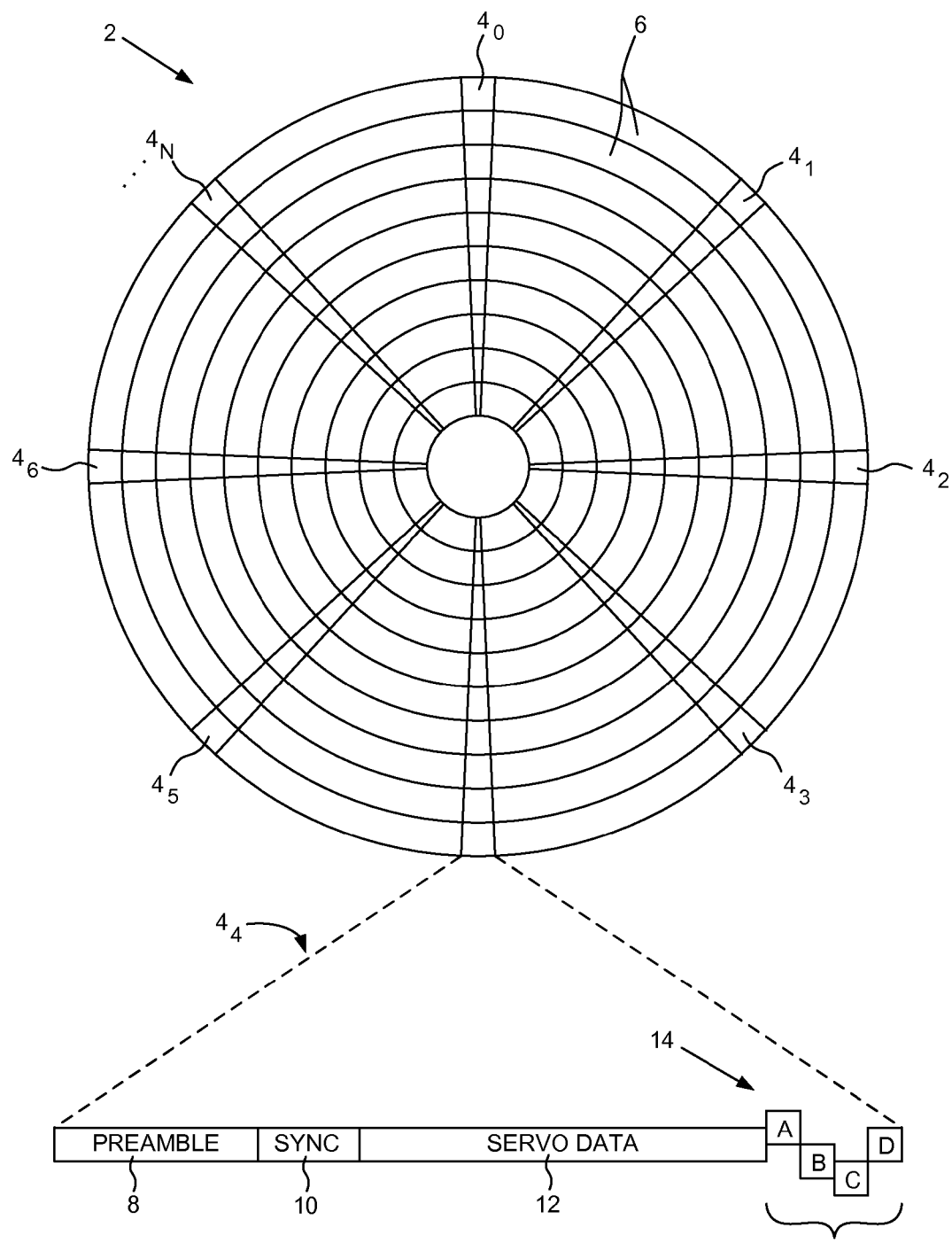
FIG. 1 shows a prior art disk format comprising a plurality of tracks defined by embedded servo sectors.
Figure 2A:
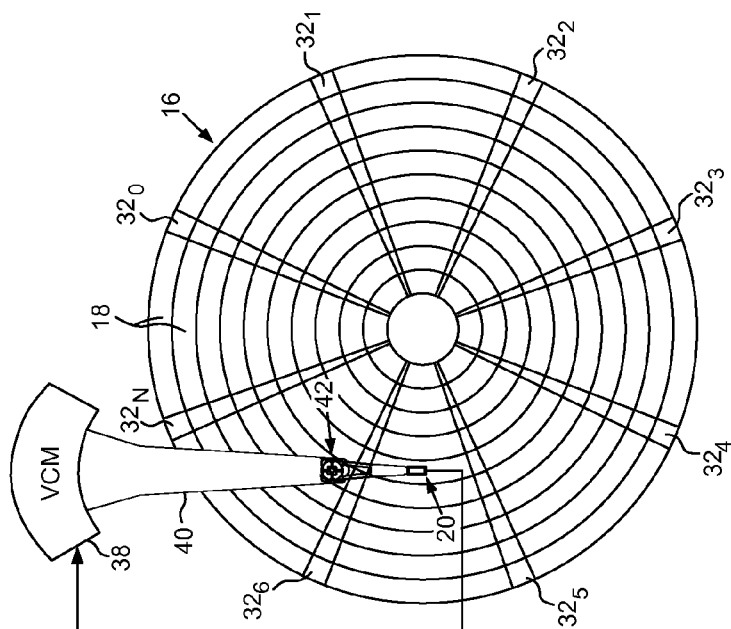
FIG. 2A shows a disk drive according to an embodiment of the present invention comprising a head actuated radially over a disk.
Figure 2B:
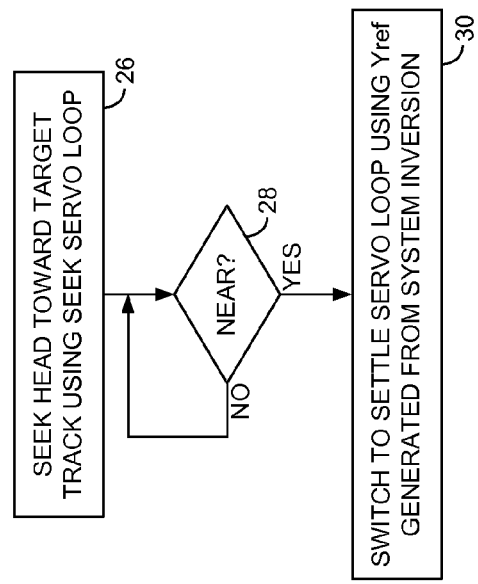
FIG. 2B is a flow diagram according to an embodiment of the present invention wherein a reference signal is generated in response to a system inversion of a settle servo loop, and the settle servo loop is used to settle the head onto a target track in response to the reference signal.

FIG. 2A shows a disk drive according to an embodiment of the present invention comprising a disk 16 having a plurality of tracks 18, a head 20, and control circuitry 22 comprising a closed loop servo system including a seek servo loop and a settle servo loop for actuating the head 20 over the disk 16. FIG. 2B is a flow diagram executed by the control circuitry 22 according to an embodiment of the present invention wherein the seek servo loop is used to seek the head toward a target track (step 26). When the head approaches the target track (step 28), the settle servo loop is used to settle the head on the target track in response to a reference signal generated in response to a system inversion of the settle servo loop (step 30).

In the embodiment of FIG. 2A, the disk 16 comprises a plurality of servo sectors $32_0$-$32_N$ that define the tracks 18. The control circuitry 22 processes a read signal 34 to demodulate the servo sectors $32_0$-$32_N$ and generate a control signal 36 applied to a voice coil motor (VCM) 38 which rotates an actuator arm 40 about a pivot in order to actuate the head radially over the disk 16. The disk drive of FIG. 2A may also comprise a microactuator 42 for assisting the actuation of the head, wherein the VCM 38 performs coarse movements and the microactuator 42 performs fine movements. In the embodiments of the present invention, the settle servo loop of the closed loop servo system may generate a control signal for either or both the VCM 38 and/or the microactuator 42.

Figure 2C:
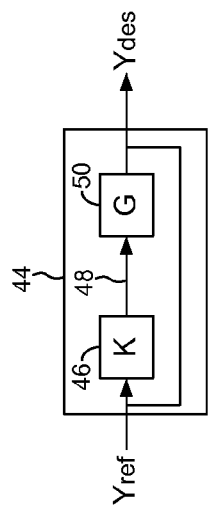
FIG. 2C illustrates switching to the settle servo loop as the head nears a target track after a seek operation according to an embodiment of the present invention.

In one embodiment, the servo sectors $32_0$-$32_N$ are demodulated into an estimated state of the closed loop servo system (e.g., position and/or velocity). In one embodiment during a settle operation, the estimated state of the settle servo loop 44 is compared to a reference signal Yref to generate an error signal as illustrated in FIG. 2C. A compensation filter 46 in the settle servo loop 44 filters the error signal to generate a control signal 48 applied to an actuator 50 (e.g., VCM 38 and/or microactuator 42) so that the state of the settle servo loop follows a desired settle profile as shown in FIG. 2C. In the embodiment of FIG. 2C, the estimated state of the settle servo loop 44 comprises a position of the head 20 as it approaches a target track.

Ideally, the reference signal Yref of FIG. 2C is generated so that the error signal is substantially zero during the settle operation. That is, a reference signal Yref can be generated such that the desired output Ydes matches the desired settle profile shown in FIG. 2C so that the error signal is zero. In one embodiment, this is accomplished by generating the reference signal Yref in response to a system inversion of the settle servo loop 44. The system inversion of the settle servo loop 44 may be computed using any suitable technique, such as computing the inversion using a transfer function of the settle servo loop 44, computing the inversion using a Fourier transform of the settle servo loop, or computing the inversion using a data-based basis function expansion of the settle servo loop wherein the reference signal Yref is generated as a summation of a plurality of a function h, and each of the plurality of the function h is shifted by an offset and scaled by a coefficient.

The data-based basis function expansion embodiment is understood with reference to FIG. 3A wherein if a function h is applied to the settle servo loop 44, the resulting output g can be measured. Since the settle servo loop is a linear time invariant system, a summation of the function h shifted by an offset and scaled by a coefficient will generate a summation of the function g shifted by the offset and scaled by the same coefficient (FIG. 3B). Therefore, if the function representing the desired output Ydes of the VCM is represented as a summation of the function g shifted by an offset and scaled by a coefficient, then the corresponding function representing the reference signal Yref can be generated as a summation of the function h shifted by the offsets and scaled by the same coefficients. In an embodiment shown in FIG. 3C, the coefficients may be generated in response to the measured output g and the desired output Ydes of the settle servo loop corresponding to the desired settle profile during a settle operation. In one embodiment, the coefficients wj are generated in response to a dual basis function q computed using a discrete Fourier transform of the measured output g, wherein the dual basis function q may be generated according to the equations shown in FIG. 3D.

Figure 4A:
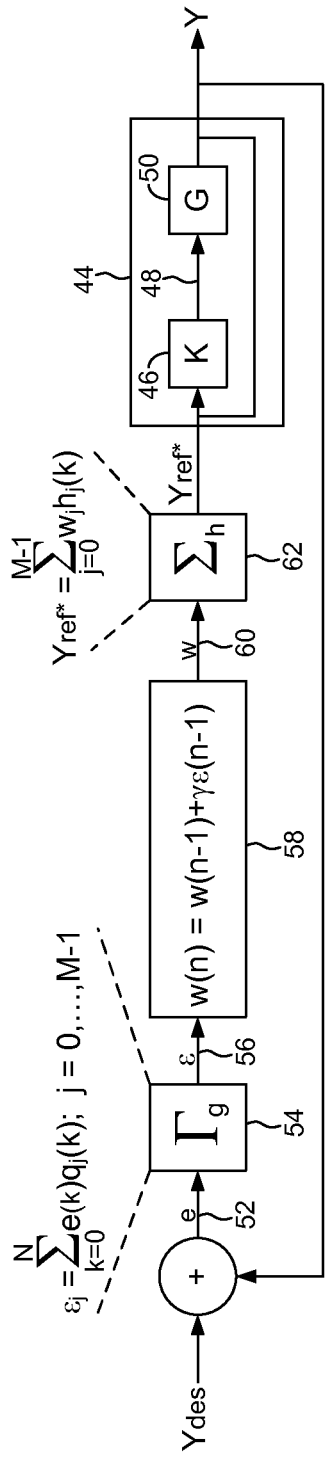
FIG. 4A shows an embodiment of the present invention wherein the coefficients are adapted using iterative learning control.

FIG. 4A shows an embodiment of the present invention wherein the coefficients w are adapted using iterative learning control. In this embodiment, a measured output of the settle servo loop Y is subtracted from a desired output of the settle servo loop Ydes during a settle operation to generate an error signal 52. The error signal 52 is combined with the dual basis function q 54 to generate a set of M×1 expansion coefficients $\epsilon(n-1)$ 56 for adapting 58 the M coefficients w. The adapted coefficients w 60 are then used to generate 62 the reference signal Yref* applied to the settle servo loop 44. After a number of iterations (a number of settle operations) the coefficients w will take on values that cause the error signal 52 to converge to substantially zero.

Figure 4B:
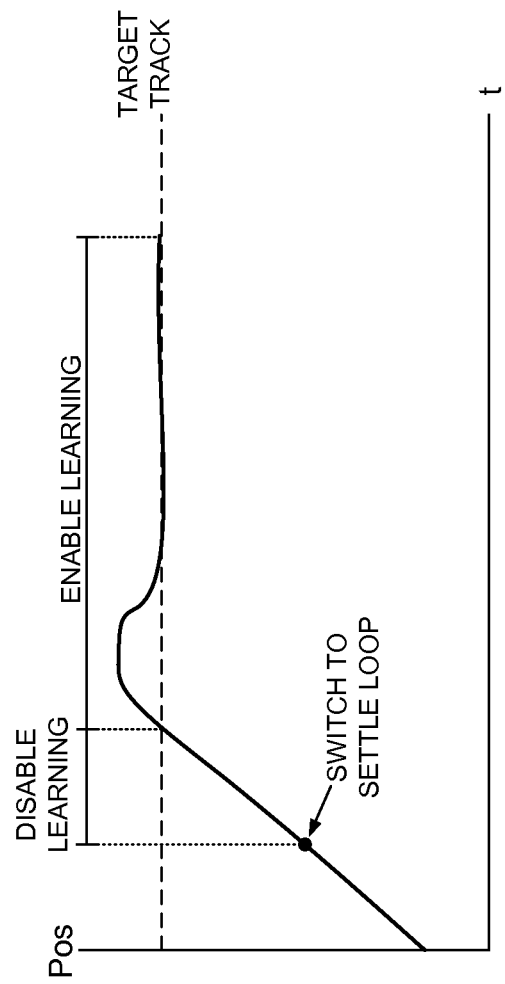
FIG. 4B shows an embodiment of the present invention wherein the coefficients are adapted after the head reaches the target track.

FIG. 4B illustrates an embodiment of the present invention wherein when the head nears the target track near the end of a seek operation, the control circuitry switches from the seek servo loop to the settle servo loop. In one embodiment, the iterative learning control described above with reference to FIG. 4A is disabled until the head reaches the target track. The iterative learning control is then enabled and the error signal generated relative to the target track for use in adapting the coefficients w.

FIG. 5A shows an embodiment of the present invention wherein the actuator control signal u* is saved while adapting the coefficients using iterative learning 64, and then used as a feed-forward control signal u* during normal operation. In this embodiment, the measured output of the settle servo loop Ymeas after adapting the coefficients is also saved and used as the reference signal Yref* during normal operation. In this manner, the feed-forward control signal u* will cause the output of the settle servo loop to substantially follow the desired settle profile, and deviations from the expected behavior (e=Yref*-Y) will be compensated by the settle servo loop 44.

FIG. 5B shows an embodiment of the present invention wherein while applying the feed-forward control signal u*, the reference signal Yref* is adapted using iterative learning control 64. This embodiment may help compensate for any mismatch between the desired and observed behavior, and/or average out potential differences due to variation of system response across the stroke of the actuator arm. In this embodiment, the feed-forward signal u* and the reference signal Yref* are used as exogenous signals to the system and a small correction to Yref* is determined using the iterative learning 64. After a number of iterations (a number of settle operations), the reference signal Yref* will converge to the desired values.

Figure 6A:
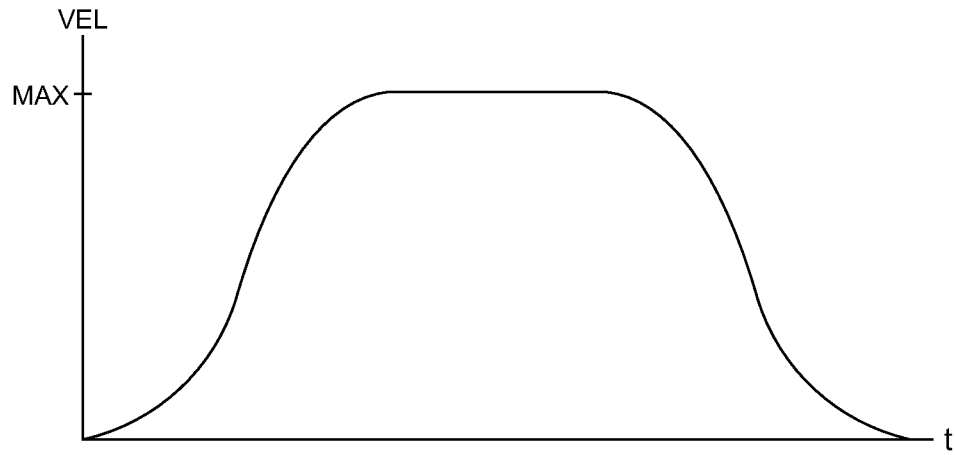
FIG. 6A shows a seek profile for a particular seek length and having a corresponding maximum seek velocity.
Figure 6B:
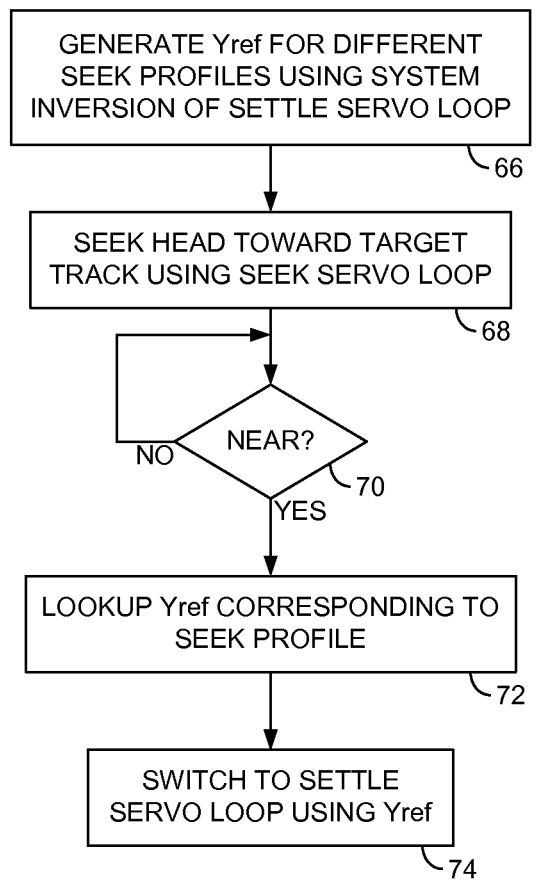
FIG. 6B is a flow diagram according to an embodiment of the present invention wherein a number of different reference signals are generated in response to a system inversion of a settle servo loop, and each reference signal corresponds to a particular seek profile.

In one embodiment, the reference signal Yref* (and optionally the feed-forward control signal u*) may be determined for a number of different seek profiles (an example of which is shown in FIG. 6A), wherein each seek profile may correspond to a particular seek length and/or to a particular maximum seek velocity. Each seek profile may include a particular settle profile for which the reference signal Yref* (and optionally the feed-forward control signal u*) may be generated. This embodiment is illustrated in the flow diagram of FIG. 6B wherein a number of different reference signals are generated each corresponding to a different seek profile (step 66). When a seek operation is performed using a particular seek profile (step 68) and the head nears the target track (step 70), the reference signal corresponding to the seek profile is retrieved (step 72) and used during the settle operation (step 74). In one embodiment, the reference signal may be retrieved (e.g., using a lookup table) during the seek operation prior to switching to the settle operation.

In one embodiment, the reference signal Yref* (and optionally the feed-forward control signal u*) may be determined during development of a family of disk drives, and nominal values copied into each production disk drive. In an alternative embodiment, the reference signal Yref* (and optionally the feed-forward control signal u*) may be determined (or tuned) by the control circuitry 22 in each production disk drive. The reference signal Yref* (and optionally the feed-forward control signal u*) may be determined once during a manufacturing procedure, and/or they may be tuned periodically during the life of the disk drive.

Any suitable control circuitry may be employed to implement the flow diagrams in the embodiments of the present invention, such as any suitable integrated circuit or circuits. For example, the control circuitry may be implemented within a read channel integrated circuit, or in a component separate from the read channel, such as a disk controller, or certain steps described above may be performed by a read channel and others by a disk controller. In one embodiment, the read channel and disk controller are implemented as separate integrated circuits, and in an alternative embodiment they are fabricated into a single integrated circuit or system on a chip (SOC). In addition, the control circuitry may include a suitable preamp circuit implemented as a separate integrated circuit, integrated into the read channel or disk controller circuit, or integrated into an SOC.

In one embodiment, the control circuitry comprises a microprocessor executing instructions, the instructions being operable to cause the microprocessor to perform the steps of the flow diagrams described herein. The instructions may be stored in any computer-readable medium. In one embodiment, they may be stored on a non-volatile semiconductor memory external to the microprocessor, or integrated with the microprocessor in a SOC. In another embodiment, the instructions are stored on the disk and read into a volatile semiconductor memory when the disk drive is powered on. In yet another embodiment, the control circuitry comprises suitable logic circuitry, such as state machine circuitry.

What is claimed is:

1. A method of operating a disk drive, the disk drive comprising a disk comprising a plurality of tracks, a head, and a closed loop servo system comprising a seek servo loop and a settle servo loop for actuating the head over the disk, the method comprising:
   seeking the head toward a target track using the seek servo loop; and
   when the head approaches the target track, switching to the settle servo loop and settling the head on the target track in response to a reference signal generated in response to a system inversion of the settle servo loop.

2. The method as recited in claim 1, wherein the reference signal is generated by:
   applying a function h to the settle servo loop and measuring a corresponding output g of the settle servo loop; and
   generating the reference signal in response to a summation of a plurality of the function h, wherein:
   each of the plurality of the function h is shifted by an offset and scaled by a coefficient; and
   the coefficients are generated in response to the measured output g.

3. The method as recited in claim 2, wherein the coefficients are generated in response to a dual basis function generated using a discrete Fourier transform of the measured output g.

4. The method as recited in claim 2, wherein the reference signal is generated by adapting the coefficients in response to a difference between a measured position of the head and a desired position of the head.

5. The method as recited in claim 3, wherein the reference signal is generated by:
   generating a difference between a measured position of the head and a desired position of the head; and
   adapting the coefficients in response to the difference and the dual basis function.

6. The method as recited in claim 5, wherein the desired position of the head is a target track.

7. The method as recited in claim 1, further comprising:
   seeking the head to the target track in response to a selected one of a plurality of seek profiles; and
   when the head approaches the target track, switching to the settle servo loop and settling the head on the target track in response to the reference signal corresponding to the selected seek profile.

8. The method as recited in claim 7, wherein each seek profile corresponds to a different seek length.

9. The method as recited in claim 7, wherein each seek profile corresponds to a different maximum seek velocity.

10. A disk drive comprising:
    a disk comprising a plurality of tracks;
    a head; and
    control circuitry comprising a closed loop servo system comprising a seek servo loop and a settle servo loop for actuating the head over the disk, the control circuitry operable to:
    seek the head toward a target track using the seek servo loop; and
    when the head approaches the target track, switch to the settle servo loop and settle the head on the target track in response to a reference signal generated in response to a system inversion of the settle servo loop.

11. The disk drive as recited in claim 10, wherein the reference signal is generated by:
    applying a function h to the settle servo loop and measuring a corresponding output g of the settle servo loop; and
    generating the reference signal in response to a summation of a plurality of the function h, wherein:
    each of the plurality of the function h is shifted by an offset and scaled by a coefficient; and
    the coefficients are generated in response to the measured output g.

12. The disk drive as recited in claim 11, wherein the coefficients are generated in response to a dual basis function generated using a discrete Fourier transform of the measured output g.

13. The disk drive as recited in claim 11, wherein the reference signal is generated by adapting the coefficients in response to a difference between a measured position of the head and a desired position of the head.

14. The disk drive as recited in claim 12, wherein the reference signal is generated by:
    generating a difference between a measured position of the head and a desired position of the head; and
    adapting the coefficients in response to the difference and the dual basis function.

15. The disk drive as recited in claim 14, wherein the desired position of the head is a target track.

16. The disk drive as recited in claim 10, wherein the control circuitry is further operable to:
    seek the head to the target track in response to a selected one of a plurality of seek profiles; and
    when the head approaches the target track, switch to the settle servo loop and settle the head on the target track in response to the reference signal corresponding to the selected seek profile.

17. The disk drive as recited in claim 16, wherein each seek profile corresponds to a different seek length.

18. The disk drive as recited in claim 16, wherein each seek profile corresponds to a different maximum seek velocity.

* * * * *